United States Patent
Crocker (10) Patent No.: US 11,479,249 B2
(45) Date of Patent: Oct. 25, 2022

(54) SPEED CONTROL SYSTEM FOR ROAD EQUIPMENT

(71) Applicant: Waterblasting, LLC, Stuart, FL (US)

(72) Inventor: James P. Crocker, Stuart, FL (US)

(73) Assignee: Waterblasting, LLC, Stuart, FL (US)

( * ) Notice: Subject to any disclaimer, the term of this patent is extended or adjusted under 35 U.S.C. 154(b) by 698 days.

(21) Appl. No.: 16/156,469

(22) Filed: Oct. 10, 2018

(65) Prior Publication Data
US 2020/0114918 A1 Apr. 16, 2020

(51) Int. Cl.
| B60W 30/18 | (2012.01) |
| B60L 7/28 | (2006.01) |
| B60W 10/04 | (2006.01) |
| B60W 10/18 | (2012.01) |
| B60T 17/22 | (2006.01) |
| B60T 15/02 | (2006.01) |
| E01C 23/00 | (2006.01) |

(52) U.S. Cl.
CPC ......... B60W 30/18063 (2013.01); B60L 7/28 (2013.01); B60T 15/027 (2013.01); B60T 17/22 (2013.01); B60W 10/04 (2013.01); B60W 10/18 (2013.01); B60W 2510/184 (2013.01); B60W 2710/18 (2013.01); E01C 23/00 (2013.01)

(58) Field of Classification Search
CPC ....... B60W 2300/17; B60W 30/18063; B60W 30/14; B60W 30/143; B60W 30/146; B60W 2300/15; B60Y 2300/14; B60Y 2300/143; B60Y 2300/146; B60T 15/027; B60T 2201/02
See application file for complete search history.

(56) References Cited

U.S. PATENT DOCUMENTS

| 5,217,282 | A | * | 6/1993 | Guichard | B60T 8/00 188/382 |
| 6,048,040 | A | * | 4/2000 | Ross | B60T 8/3605 303/119.1 |
| 2014/0076641 | A1 | * | 3/2014 | Penev | H02S 10/12 180/2.2 |
| 2014/0318903 | A1 | * | 10/2014 | Simpson | B60T 17/20 188/1.11 R |
| 2015/0283866 | A1 | * | 10/2015 | Dieckmann | B60C 23/002 701/36 |
| 2015/0329116 | A1 | * | 11/2015 | Bulgrien | B60W 10/11 192/219.4 |
| 2018/0222477 | A1 | * | 8/2018 | Wang | B60W 50/0097 |
| 2019/0135249 | A1 | * | 5/2019 | Fridman | B60T 8/32 |
| 2019/0256066 | A1 | * | 8/2019 | Kanda | B60T 8/17 |
| 2020/0317060 | A1 | * | 10/2020 | Dunning | B60L 7/28 |
| 2021/0221341 | A1 | * | 7/2021 | Galizzi | B60T 13/74 |

* cited by examiner

*Primary Examiner* — Donald J Wallace
(74) *Attorney, Agent, or Firm* — McHale & Slavin, P.A.

(57) ABSTRACT

The invention involves a low speed control system and method for automatically regulating the speed of work vehicles or equipment and, more particularly, vehicles that apply, remove or modify roadways or road markings. The system includes a controller, a speed display, at least one rotary encoder or the like, and one or more Eddy current or mechanical brakes for inhibiting motion of the vehicle at the operator's control. The brakes may be pneumatic, spring operated, Eddy current, or hydraulic that are controlled in response to feedback from the at least one rotary encoder for compliance with the preset speed on the speed display. In another embodiment, a throttle control is also provided.

9 Claims, 6 Drawing Sheets

SPEED CONTROL SYSTEM FOR ROAD EQUIPMENT

FIELD OF INVENTION

The present invention generally relates to mobile vehicles and, more particularly, to vehicles that require a precise slow speed to perform work such as road marking and maintenance.

BACKGROUND INFORMATION

In the United States, the first documented use of a painted center line was along Trenton's River Road in Wayne County, Mich., in 1911, when Edward N. Hines watched a leaky milk wagon leave a white trail along a road. A road surface marking is any kind of device or material applied to a road surface in order to convey official information. Typically, road surface markings are used on paved roadways to provide guidance information to both drivers and pedestrians. Marking uniformity is an important factor in minimizing confusion and uncertainty about their meaning, and efforts exist to standardize such markings.

Road surface markings vary in form: surface level permanently affixed, surface level temporarily but not permanently affixed, higher than road surface markers, and/or mechanical devices. They are designed to inform motorist and pedestrians. Their designs range from merely a daytime or nighttime visual presentation to a raised or lowered pavement marker that advises motorist by light reflection, or vehicle vibration resulting from contact between the vehicles tires and the marker. Efforts to improve road marking systems exist in the realm of the application of such markings, adding retro-reflectivity, increasing longevity, and lowering installation costs.

More specifically, two distinctions exist for road surface markings: mechanical and non-mechanical markings. Mechanical devices may be raised or recessed into the road surface, and either reflective or non-reflective. Most mechanical road surface markings are permanent; however, some are movable. Mechanical devices include, but are not limited to Botts' dots, rumble strips, and reflective markers. Botts' dots, low rounded white dots, generally are used to mark the edges of traffic lanes, frequently in conjunction with raised reflective markers. Rumble strips are typically a series of simple troughs that are ground into the asphalt. They can be used across the travel direction to warn of hazards ahead, or along the travel direction to warn of hazards of not staying within a specific lane. They create a strong vibration when driven over in order to alert a driver to various upcoming hazards, both by sound and the physical vibration of the vehicle. Reflective markers are used as travel lane dividers to mark the median or to mark exit slip-roads. By incorporating a raised retro-reflective element, they are typically more visible at night and in inclement weather than standard road marking lines.

Non-mechanical markings include, but are not limited to paint, thermo-set, tape, and thermoplastic pavement markings. Paint, which sometimes includes additives such as retro-reflective glass beads, is generally used to mark travel lanes, spaces in parking lots or special purpose spaces for disabled parking, loading zones, or time-restricted parking areas. Paint is a low-cost application, and is usually applied right after the road has been paved. The road is commonly marked by a truck called a "striper." These trucks typically contain hundreds of gallons of paint stored in huge drums which sit on the bed. The markings are controlled manually or automatically by a controller who sits on the truck bed. An operator sits at the rear of the truck with a secondary steering wheel to guide the truck from the rear as the stripes are applied. Paint is directed through a series of hoses under pressure and applied to the roadway surface, along with the application of glass beads for retro-reflectivity. Painted symbols, such as turn-lane arrows or HOV lane markers, may be applied manually or using stencils.

Thermoplastic is one of the most common types of road surface marking based on its balance between cost and performance longevity. It is durable, easy to apply, and reflective. For low traffic areas, traffic paint is suitable and will last for a year or so. However, in higher traffic areas, paint simply cannot handle the wear and will disappear in just a few months. The longevity of thermoplastic makes it a very cost effective traffic delineation solution. Thus, the use of thermoplastics over paints has increased; mainly due to the performance benefits of increased durability, retro-reflectivity, and a lack of volatile organic compound (VOC) solvents. Furthermore, municipalities like these features because they can budget for a thermoplastic job once every several years instead of having to budget for paint striping every year or less.

Numerous machines and methods are also available for forming so-called rumble strips along with the road markings of roadways. Rumble strips are provided at the margins of the driving lane so that, when encountered by the wheels of a vehicle, the vehicle is vibrated and sound is generated to inform the driver that the vehicle has wandered from the driving lane. A rumble strip can be in one of two forms. It can be a series of elongate raised ribs spaced apart along the length of the road, or a rumble strip can also be a series of elongate grooves in the roadway. A rumble strip can be formed in either the shoulder material or in the surface of the roadway itself, depending on the need. The rumble strips can be positioned adjacent to each other to provide a constant rumble, or they can include periodic spacing that provides an interrupted rumble when driven over.

There are also machines that remove roadway markings due to wear or changes in traffic patterns, etc. Water blasters and grinders are typically utilized to perform the task of marking removal. In these operations, the plastic and polymers utilized for the road markings are blasted from the roadway, or ground away from the roadway, and vacuumed into a holding tank for disposal.

Thus, a need exists in the art for a system to control the low speed operation of a work vehicle.

Thus, the present system provides a system to control the low speed operation of a work vehicle. The low speed control system of the present invention not only provides for relative ease in assembly and operation, it also permits retrofit to pre-existing work vehicles.

SUMMARY OF THE INVENTION

Briefly, the invention involves a low speed control system and method for automatically regulating the speed of work vehicles or equipment, and more particularly, vehicles that apply, remove or modify roadways or road markings. The system includes a controller, a speed display, at least one rotary encoder or the like, and one or more Eddy current or mechanical brakes for inhibiting motion of the vehicle at the operator's control. The brakes may be pneumatic, spring operated, Eddy current, or hydraulic that are controlled in response to feedback from the at least one rotary encoder for compliance with the preset speed on the speed display. In another embodiment, a throttle control is also provided. This allows the vehicle or the equipment speed to be controlled in real-time as the vehicle moves.

Accordingly, it is an objective of the present invention to provide a low speed control system for vehicles.

It is a further objective of the present invention to provide a low speed control system for vehicles, which is capable of reducing the speed of a vehicle to allow the vehicle to complete work on a roadway as the vehicle moves.

It is yet a further objective of the present invention to provide a low speed control system for vehicles, which is capable of providing precise control of the vehicle speed at low velocities.

It is another objective of the present invention to provide a kit for a low speed control system for vehicles for installation on pre-existing road marking equipment.

Other objectives and advantages of this invention will become apparent from the following description taken in conjunction with the accompanying drawings wherein are set forth, by way of illustration and example, certain embodiments of this invention. The drawings constitute a part of this specification, include exemplary embodiments of the present invention, and illustrate various objects and features thereof.

DETAILED DESCRIPTION OF THE PREFERRED EMBODIMENTS

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiments illustrated.

Figure 1:
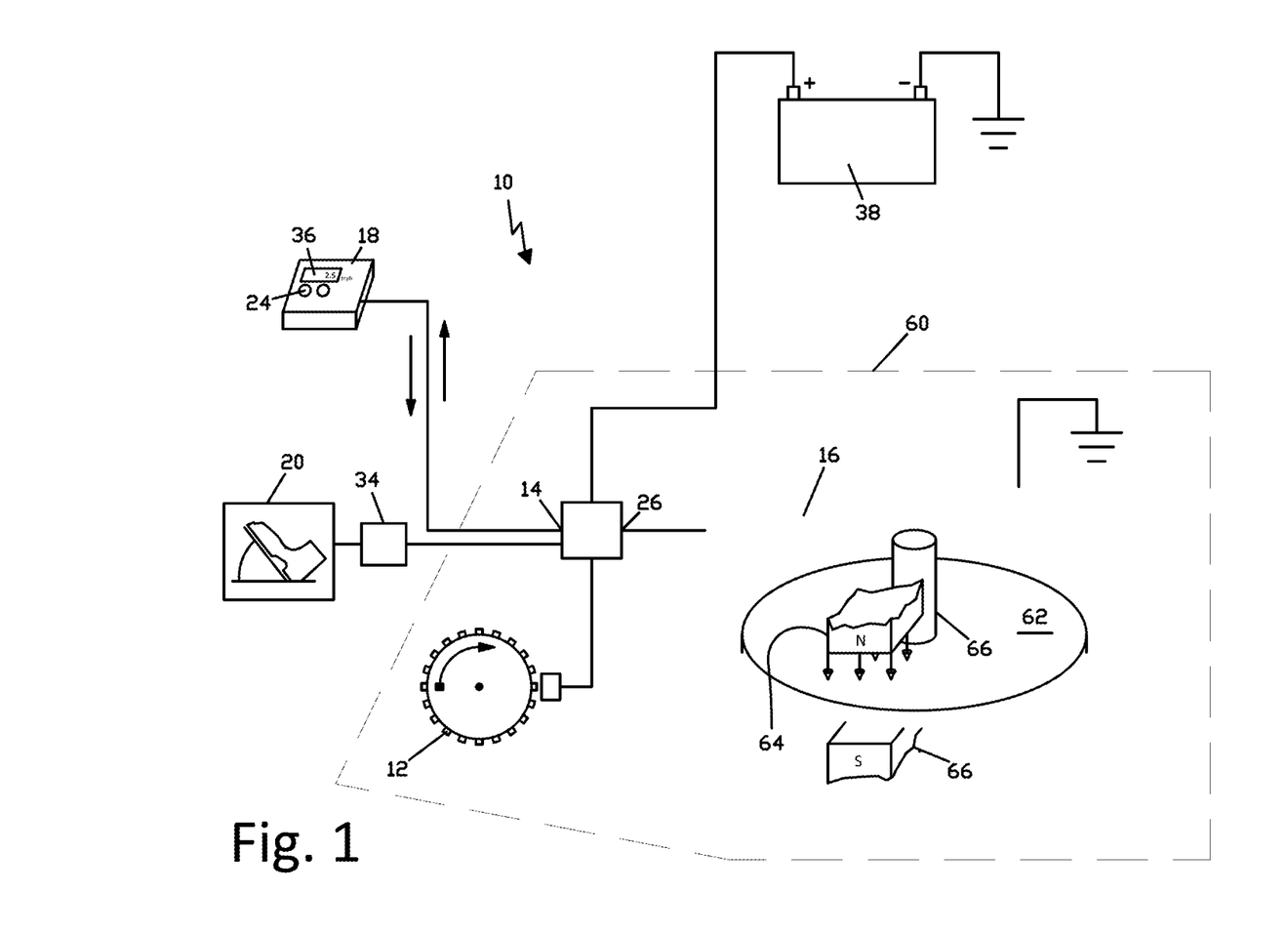
FIG. 1 is a schematic view of one embodiment of the present invention.
Figure 2:
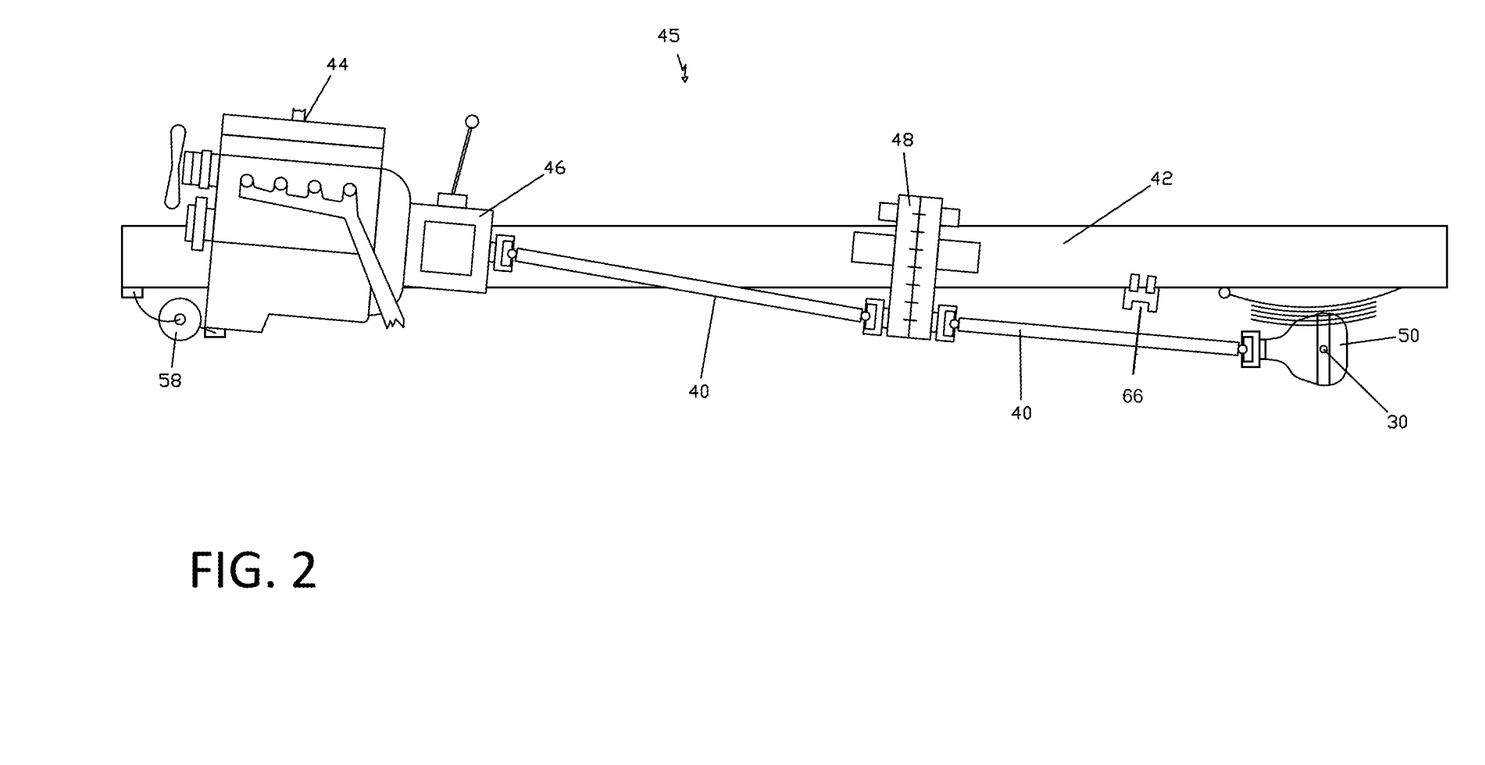
FIG. 2 is a partial side view illustrating the low speed control system secured to a vehicle.
Figure 3:
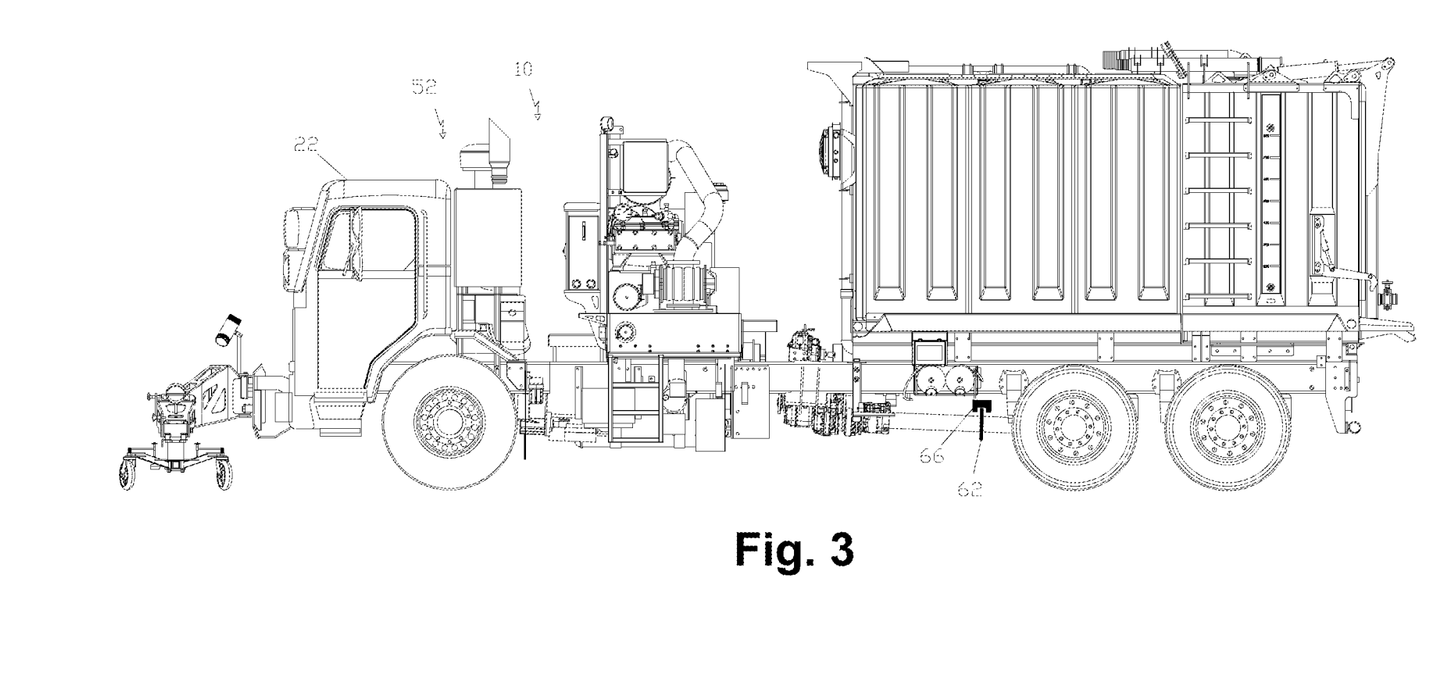
FIG. 3 is a side view illustrating the system of FIG. 1 secured to a water blasting truck.
Figure 4:
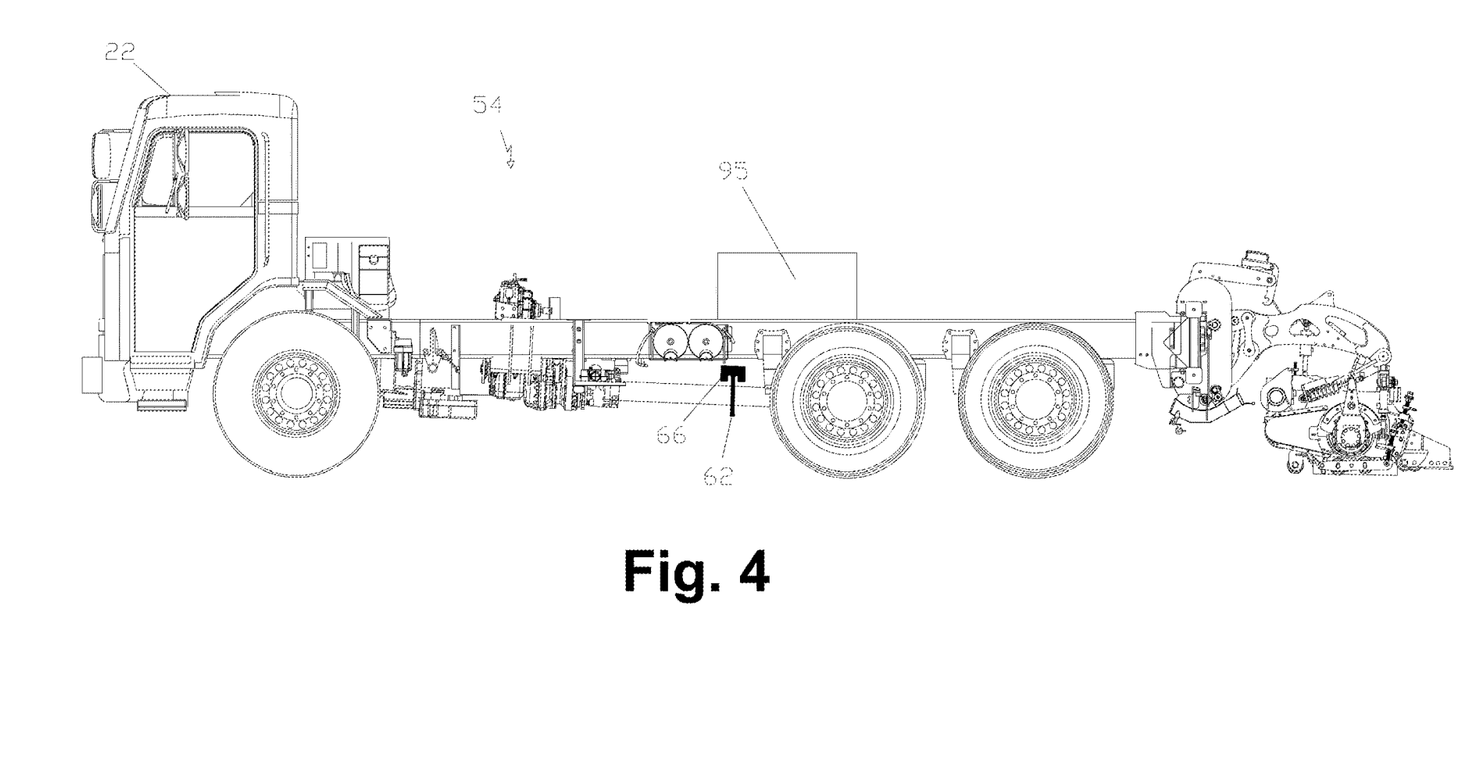
FIG. 4 is a side view illustrating the system of FIG. 1 secured to a rumble strip grinding truck.
Figure 5:
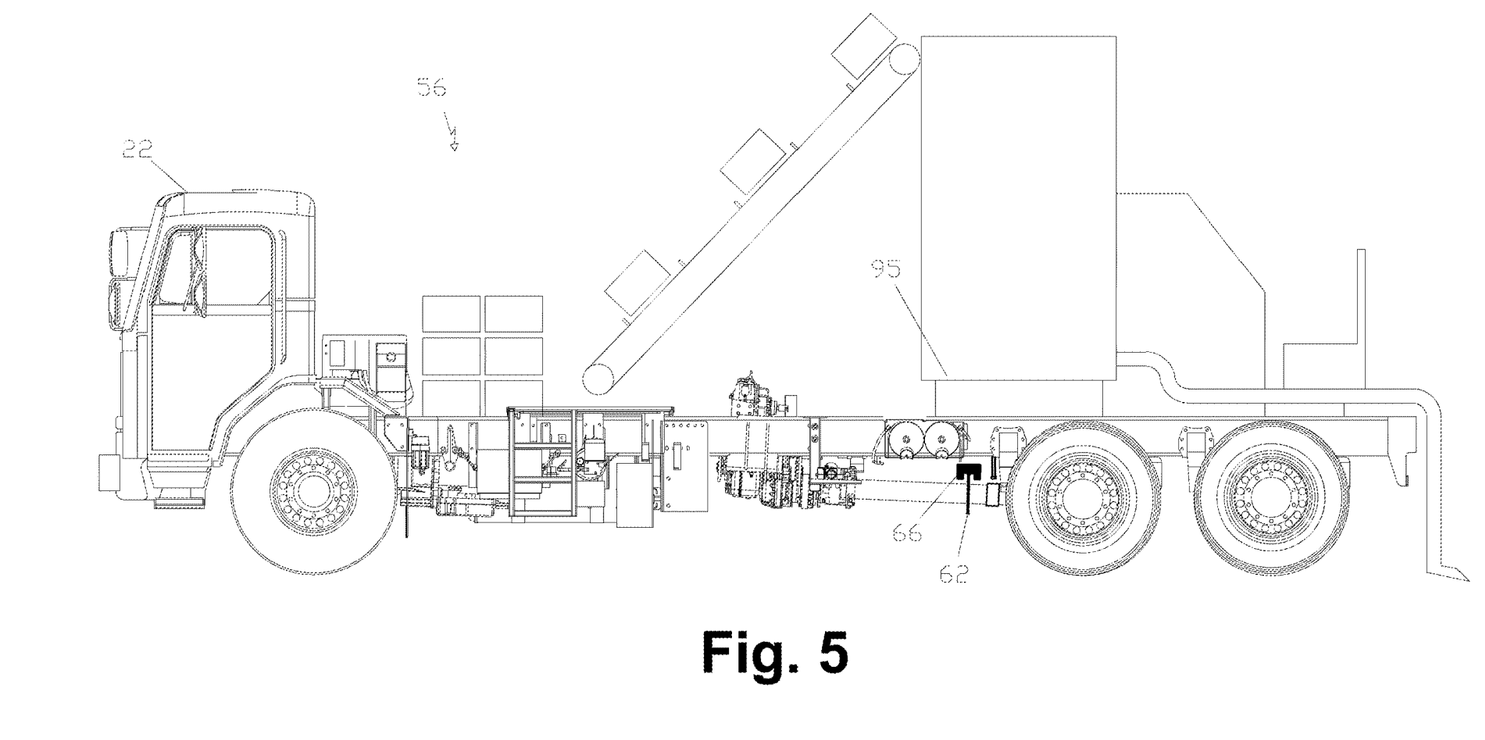
FIG. 5 is a side view illustrating the system of FIG. 1 secured to a road marking truck.

Referring generally to FIGS. 1-6, a control system 10 for maintaining low speeds in a work vehicle 22 is illustrated. In general, a work vehicle, as described in this paper, refers to a vehicle that is used to do work as it moves, utilizing equipment secured to the vehicle to do the work, and particularly at low speeds or speeds at or less than 10 miles per hour. Low speeds are difficult to maintain with a work vehicle that is typically heavy and may include a manual or automatic primary transmission 46. Hills and undulating terrain create problems, as the work vehicle is traveling up and down hills or around corners; making it difficult to maintain a desired and consistent working speed. For example, FIG. 3 illustrates a water blasting truck 52 for removing markings from a roadway; FIG. 4 illustrates a grinder truck 54 for making rumble strips, reflector troughs and the like; and FIG. 5 illustrates a paint truck 56 for applying roadway markings. While these trucks are illustrative of low speed work trucks, the present construction is not limited to these particular trucks, and the technology can be utilized on any low speed work type vehicle for maintaining consistent low speeds.

Still referring generally to the Figures, and particularly to FIGS. 1 and 2, the work vehicle typically includes a frame 42, an engine 44 connected to a driveline 45 for propelling said work vehicle, said driveline including a primary transmission 46, at least one driveshaft 40 and a drive axle 30. The driveline 45 may further include a secondary transmission 48 for driving auxiliary equipment, such as pumps and the like. A brake system 58 for slowing or stopping the work vehicle may be hydraulic or air powered and may include at least one spring brake 82 that is also air operated, as is known in the art.

In one embodiment, the low speed control system 10 includes a low speed control module 14 for establishing and monitoring a user set low speed for the vehicle 22 to maintain. The low speed control module 14 is in electrical communication with a display monitor 18, a brake module 60, and the vehicle's on-board computer 34. The low speed control module 14 may include memory, processors and the like, which allow the low speed control system 10 to record and recall speeds, average work speeds, and skip speeds which allow the vehicle to speed up and slow down at predetermined intervals and the like. In this manner, the display monitor 18 can be utilized to establish the low speed desired for vehicle travel, and may provide increased working speeds by speeding the vehicle between, for example, intermittent road stripes. Either or both the vehicle's on-board computer 34 and/or an encoder 12 may be utilized for monitoring the speed of the vehicle with respect to the ground surface. The encoder 12 is secured to a portion of the vehicle that rotates when the vehicle moves. Alternatively, cameras or the like that watch the ground surface and determine vehicle speed may be utilized without departing from the scope of the invention. In one embodiment, the brake module 60 includes an Eddy current brake assembly 16. The Eddy current brake assembly 16 includes a brake rotor 62 and an Eddy brake caliper 64. The brake rotor 62 is constructed and arranged to rotate with a portion of the vehicle when the vehicle moves, for example a driveshaft 40, axle 50 or the like. The Eddy brake rotor 62 is constructed from a conductive metal having an electromagnet 66 positioned in the caliper 64 so that a portion of the electromagnet 66 is positioned on each side of the rotor, so that the magnetic field passes through the rotor 62. Power supplied to the electromagnet 66 regulates the braking force, e.g. more electrical power provides more drag on the vehicle. In this manner, the braking or drag force can be regulated to control the speed of the vehicle as it traverses hills and curves and other terrain. In at least one embodiment, the low speed control module 14 is in electrical communication with a throttle control 20 for the engine of the vehicle 22. This communication may be to a solenoid or motor to move the throttle. In one embodiment, the low speed control module 14 is in electrical communication with the vehicle's on-board computer 34, which provides access to the throttle control through the on-board computer 34. In this manner, the speed of the vehicle may be monitored in place of, or in addition to, the encoder 12, and the throttle of the vehicle engine may be utilized to speed up the vehicle in an uphill or other maneuver that requires additional speed to achieve the set speed 36.

Figure 6:
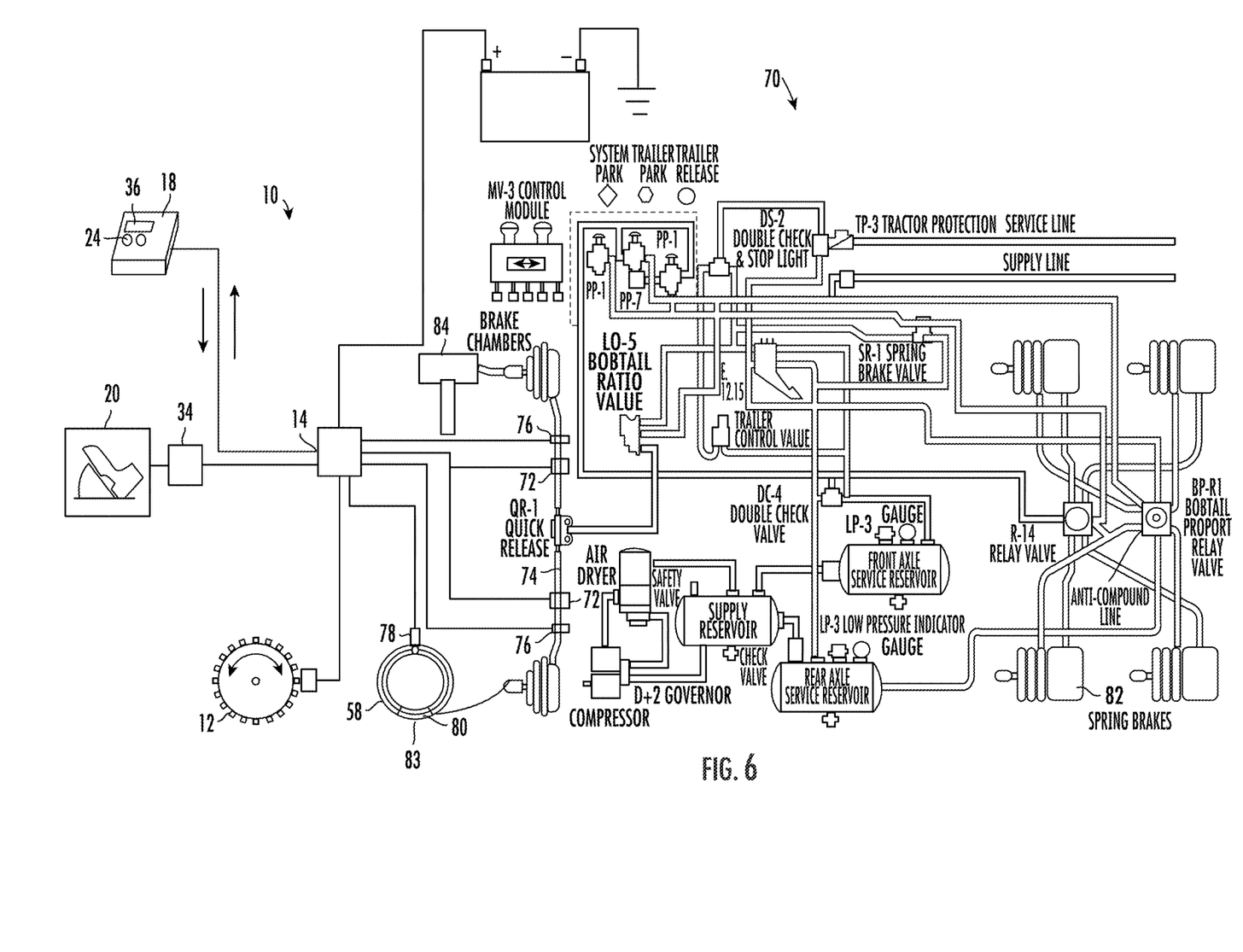
FIG. 6 is a schematic view illustrating an alternative embodiment of the low speed control system.

Referring to FIGS. 1-6, and particularly FIG. 6, a low speed control system 10 utilizing pressurized air to control brake operation for creating drag on the work vehicle 22 is illustrated. In this system, one air brake 58, as part of the factory air brake system 70, includes an air control valve 72 positioned along an air-line 74 extending to an air brake 58, said air control valve 72 in electrical communication with said low speed control module 14 so that said low speed control valve 72 regulates an amount of pressurized air maintained within the air brake 58 to control drag on that particular air brake. In at least one embodiment, the low speed control system includes a temperature sensor 78 positioned to monitor an operating temperature of the air brake 58. The temperature sensor 78 is in electrical communication with the low speed control module 14. In yet another embodiment, the low speed control system 10 includes a plurality of temperature sensors 78, each temperature sensor positioned to monitor an operating temperature of a different air brake 58 and in electrical communication with the low speed control module 14. In this manner, the low speed control system 10 can monitor the temperature of each air brake 58 and switch from one air brake 58 to a different brake 58 as the temperature of the brake increases, or simply to equalize the wear on the brake shoes or pads 80. In this embodiment, an air control valve 72 is positioned along a respective air-line 74 extending to a respective air brake 58, each air control valve 72 in electrical communication with the low speed control module 14. Also in this embodiment, an algorithm may be utilized to determine which brake should be utilized next to maintain the desired brake temperature and wear characteristics desired. It is also desirable to include an air pressure sensor 76 for each respective air brake 58 utilized for the low speed control system 10. The air pressure sensor 76 should be suitable for measuring air pressure within the respective air-line 74, and be in electrical communication with the low speed control module 14. The present system is suitable for use with all air brakes, including spring brakes 82, drum brakes 83 and disc brakes 84, and a system may include any number of any of these types of brakes without departing from the scope of the invention. When the present system is utilized with a spring brake 82, air pressure is used to control spring pressure against brake operation, so that spring pressure applied to the spring is limited to cause drag on the work vehicle.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement of parts herein described and shown. It will be apparent to those skilled in the art that various changes may be made without departing from the scope of the invention, and the invention is not to be considered limited to what is shown and described in the specification.

One skilled in the art will readily appreciate that the present invention is well adapted to carry out the objects and obtain the ends and advantages mentioned, as well as those inherent therein. Any compounds, methods, procedures and techniques described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A control system for maintaining low speeds in a work vehicle comprising:
    a work vehicle, said work vehicle including a frame, an engine connected to a driveline for propelling said work vehicle;
    an air brake system for slowing or stopping said work vehicle, said air brake system including a brake module with a first air control valve positioned along an air line extending to a first air brake, said first air control valve maintaining an amount of pressurized air within said air line providing a constant drag on said first air brake while said work vehicle is moving, a second air control valve positioned along said air line extending to a second air brake, said second air control valve maintaining an amount of pressurized air within said air line providing a constant drag on said second air brake while said work vehicle is moving;
    a speed control system operational when said work vehicle is traveling below 10 mph, said speed control system including a speed control module having an encoder for monitoring a speed for said vehicle to maintain, said speed control module monitoring the speed of said work vehicle with respect to the ground surface, said speed control module in electrical communication with said air brake system and a throttle control for said engine of said work vehicle while said first or second air brake is engaged to provide a constant drag;
    a temperature sensor to monitor the temperature of said first and second air brake, said temperature sensor electrically coupled to said speed control module for maintaining a desired brake temperature of said first and second air brake by regulating the amount of drag on said first and second air brake while said work vehicle is moving;
    whereby said speed control system controls said speed of said work vehicle by operation of said air brake system and said throttle control.

2. The control system of claim 1 wherein said speed control module is in electrical communication with a vehicular on-board computer, said on-board computer monitoring a speed of said work vehicle, said speed communicated to said speed control module in real time to maintain the constant drag of said first and second air brakes at a speed less than 10 mph.

3. The control system of claim 1 wherein said speed control module is constructed and arranged to alternate engagement of said first and second air brakes used for drag to control the speed of said work vehicle.

4. The control system of claim 3 wherein readings from said plurality of temperature sensors are utilized to determine whether the first or second air brake is utilized to provide a drag on said work vehicle.

5. The control system of claim 1 including an air pressure sensor for measuring air pressure within said air line, said air pressure sensor in electrical communication with said speed control module.

6. The control system of claim 1 wherein said brake system is a spring brake, said spring brake utilizing air pressure to control spring pressure against brake operation, so that spring pressure applied to said spring brake is limited to cause drag on said work vehicle.

7. The control system of claim 1 wherein said speed control module includes an algorithm for controlling said brake module to regulate the amount of drag on each said first and second air brake to maintain a desired brake temperature.

8. A control system for maintaining low speeds in a work vehicle comprising:
- a work vehicle, said work vehicle including a frame, an engine connected to a driveline for propelling said work vehicle;
- an air brake system for slowing or stopping said work vehicle, said air brake system including a brake module with a first air control valve positioned along an air line extending to a first air brake, said first air control valve maintaining an amount of pressurized air within said air line providing a constant drag on said first air brake while said work vehicle is moving, a second air control valve positioned along said air line extending to a second air brake, said second air control valve maintaining an amount of pressurized air within said air line providing a constant drag on said second air brake while said work vehicle is moving;
- a speed control system operational when said work vehicle is traveling below 10 mph, said speed control system including a speed control module having an encoder for monitoring a speed for said vehicle to maintain, said speed control module monitoring the speed of said work vehicle with respect to the ground surface, said speed control module in electrical communication with said air brake system and a throttle control for said engine of said work vehicle while said first or second air brake is providing a constant drag;
- a temperature sensor to monitor the temperature of said first and second air brake, said temperature sensor electrically coupled to said speed control module for alternating said first and second air brakes to alternate brake engagement when a temperature of said first or second air brake exceeds a predetermined level while said work vehicle is moving;
- whereby said speed control system controls said speed of said work vehicle by operation of said air brake system and said throttle control.

9. The control system of claim 8 wherein said speed control module includes an algorithm for controlling said brake module to regulate the amount of drag on said first and second air brake to maintain a desired air brake temperature and air brake wear characteristics.

* * * * *